United States Patent Office

2,816,044
Patented Dec. 10, 1957

2,816,044

MANUFACTURE OF PLASTIC ARTICLES

Franz Sam Deutsch, Barry, Francis Ronald Smith, Penarth, and Harold John Pratt, Barry, Wales, assignors to British Resin Products Limited, London, England, a British company No Drawing. Application January 21, 1953, Serial No. 332,494

Claims priority, application Great Britain January 30, 1952

5 Claims. (Cl. 106—182)

This invention relates to the production of plastic articles having pearlescent surfaces. Such articles are much in demand since they have a particularly pleasing appearance which is due, at least in part, to their similarity to traditional materials. These effects are usually obtained on light coloured materials which are themselves more pleasing in appearance and more desirable on hygienic grounds since they are easier to keep clean. The broken appearance of the surface also tends to conceal slight imperfections introduced during manufacture which are not so apparent as they would be in an article with a plain, uniformly coloured surface.

These effects have hiterto been obtained by the addition of materials commonly known as "pearl essences" to the moulding composition. These "pearl essences" are mostly prepared from guanine which is extracted from fish scales, dried and dispersed in a suitable medium. This process is elaborate and costly and the guanine crystals are very susceptible to destruction under the conditions of temperature and pressure necessary for their incorporation into plastic compositions.

An object of the present invention is the production of articles having the said pearlescent effect without using guanine or the like substances.

Accordingly, the present invention comprises a resinous composition having a pearlescent surface, in which 1 to 20% by weight of bismuth oxysalicylate or 0.1 to 10% by weight of bismuth oxycarbonate is incorporated in a cellulose or polystyrene resin as hereinafter defined, or in which 1 to 5% by weight of bismuth oxycarbonate is incorporated in a phenol-formaldehyde resin.

The phrase cellulose resin refers to cellulose derivatives such as cellulose acetate, for instance cellulose acetate having an acetyl content (as acetic acid) of between 50 and 60%, celulose propionate, cellulose acetopropionate, cellulose acetobutyrate, having for instance a butyryl content (as butyric acid) of 36 to 37% and acetyl content (as acetic acid) of 13 to 14%, and ethyl cellulose having for instance an ethoxyl content of 42 to 50%. By "polystyrene resin" is meant a polymer of styrene, alphamethyl styrene, their chlor-, methyl-, and/or ethyl nuclear substituted derivatives, and copolymers of these substances. The term "phenol-formaldehyde resin" refers to the products of condensation of formaldehyde with phenols, and includes resins made with monohydroxy phenols, such as phenol, cresols and xylenols and dihydroxy phenols such as resorcinol and the like. The phenol-formaldehyde resins are preferably used in their light-stable form.

Bismuth oxycarbonate is believed to have the formula $(BiO)_2CO_3$, and bismuth oxysalicylate the formula $Bi(C_7H_5O_3)_3.Bi_2O_3$. While the use of some bismuth compounds as stabilisers in polyvinyl chloride compositions has been disclosed in the art, it is believed that the use of the oxycarbonate and oxysalicylate for decorative purposes in conjunction with the specified thermoplastic moulding materials is novel.

The proportions of bismuth salts specified above are preferred since outside these ranges the pearlescent effect becomes difficult to observe, or is obscured by a white opacity.

The bismuth salt is blended with the transparent plastic material in either the coloured or uncoloured state. In a preferred embodiment of the invention the bismuth salt is mixed with a portion of the plastic material and the mixture is then incorporated with the remainder in order to produce a final composition containing the desired proportion of bismuth salt. The moulding composition may also contain any of the usual plasticisers, accelerators and the like which are required in order to produce a satisfactory product.

The bismuth salts may be incorporated into the moulding material in any convenient manner, but preferably by working into a portion of the plastic material on hot rolls and this mixture sheeted, ground, and mixed with the remainder of the material which had been sheeted and ground in a similar manner.

The final fabrication of articles from this moulding composition may be carried out by any known process such as injection, compression or transfer moulding or by casting, according to the type of material and the type of object which is required. The moulded objects may assume the form of sheets, films, coatings, rods, plates, filaments and utilitarian articles such as dishes, ashtrays and the like.

Example 1

A mixture, compound I, was made by milling the following on a conventional, even speed, heated roller mill for 10 minutes, with the temperature of the front roll 150° C., and the rear 110° C.:

| | Parts |
|---|---|
| Finely ground cellulose acetate flakes. (52.5% combined acetic acid) | 100 |
| Dimethyl phthalate | 37.5 |
| Bismuth oxysalicylate | 6.9 |

Another mixture, compound II, was made by milling the following under similar conditions:

| | Parts |
|---|---|
| Cellulose acetate flakes | 100 |
| Dimethyl phthalate | 55.5 |

The sheets of material obtained after milling were ground on a Masson cutter having a 5 mm. screen in order to obtain moulding powders. Three parts of compound I were blended with one part of compound II to give a moulding powder which on being injection moulded at 170° C. produced moulded objects having a pleasing pearlescent effect.

Example 2

A mixture, compound A, was made by milling on a conventional, even-speed, heated roller mill, the following ingredients:

| | Parts |
|---|---|
| Finely ground cellulose acetate flakes (52.5% combined acetic acid) | 100 |
| Dimethyl phthalate | 34 |
| Tri-phenyl phosphate | 14 |
| Bismuth oxycarbonate | 14.8 |

The front roll was maintained at a temperature of 150° C. and the rear roll at 110° C.

Another mixture, compound B was made by milling under the same conditions:

| | Parts |
|---|---|
| Cellulose acetate flakes | 100 |
| Dimethyl phthalate | 45 |
| Triphenyl phosphate | 18 |

The sheets of material obtained after milling were ground on a Masson cutter having a 5.0 mm. perforated screen to obtain moulding powders. Equal parts of compounds A and B were blended to give a moulding powder which on being injection-moulded at 170° C., produced moulded articles with a pearlescent effect.

The use of dimethyl phthalate and triphenyl phosphate as plasticisers as in Examples 1 and 2 is not critical, and any of the known cellulose acetate plasticisers may be used.

*Example 3*

| | Parts |
|---|---|
| Uncoloured polystyrene (average mol. wt.)= 200,000 | 100 |
| Rhodamine 6 G (Colour Index 1924, No. 752 Farbstofftabellen, Schultz, 1923, No. 571) | 0.180 |
| Acetone Brown 89248 (produced by Williams (Hounslow) Ltd.) | 0.316 |
| Bismuth oxycarbonate | 1.100 |

The above ingredients were mixed on a commercial twin screw extruder mixer at a barrel temperature of 180° C. and extruded in the form of square rods of approximately ⅛ inch sides. These rods were cut into granules by means of a rotary cutter to produce a moulding powder which could be moulded at a temperature of 180° C. to produce a very attractive rose coloured moulding showing a pearlescent effect.

*Example 4*

The following ingredients were compounded on a conventional even-speed roller-mill. The front roll was maintained at a temperature of 170° C. and the rear roll at 140° C.

| | Parts |
|---|---|
| Uncoloured polystyrene (average mol. wt. = 200,000) | 100 |
| Bismuth oxysalicylate | 20 |

The sheets of material after milling were ground on a Masson cutter having a 5.0 mm. screen to produce a moulding powder.

Three parts of this moulding powder were mixed with two parts of a softer grade of polystyrene moulding powder of average mol. wt. of 80,000. This blend was injection moulded at 210° C. and produced moulded objects having a pleasing pearlescent effect.

*Example 5*

A resole was prepared by reacting 100 parts of a commercial cresylic acid containing approximately 50% meta-cresol with 88 parts of formalin solution (37.5% w./w.) and 3.5 parts of ammonia solution (S. G. 0.910). The liquid resin was dehydrated by vacuum distillation to produce a solid of M. P. 60° C.

100 parts of this resin were milled with 1 part of oleic acid and varying quantities of bismuth oxycarbonate on a conventional set of mixing rolls, at temperatures of 120° C. front roll and 140° C. back roll. After 27 to 28 minutes milling the product was removed, cooled and ground to pass a 3 mm. screen, producing a moulding powder which could be compression moulded in 2 minutes at 163° C.

The quantities of bismuth oxycarbonate employed were 0.3, 1, 5 and 20 parts. It was found that 0.3 part was hardly sufficient to produce a pearlescent effect, while 20 parts were too much, the bismuth salt acting simply as a white pigment, but the mouldings containing 1 and 5 parts showed an attractive pearlescence.

We claim:

1. A plastic composition having a pearlescent surface and being selected from the group consisting of cellulose ester and alkyl cellulose containing a member selected from the group consisting of bismuth oxysalicylate in an amount of from 1 to 20% by weight and bismuth oxycarbonate in an amount of from 0.1 to 10% by weight, said composition being free from any added stabilizer.

2. A plastic composition having a pearlescent surface which comprises a cellulose ester containing bismuth oxycarbonate in a concentration of between 0.1 and 10% by weight in the absence of any added stabilizer.

3. A plastic composition having a pearlescent surface which comprises a cellulose ester containing bismuth oxysalicylate in a concentration of between 1 and 20% by weight in the absence of any added stabilizer.

4. The method of imparting an ornamental pearlescent surface to a cellulose ester which comprises incorporating thereinto bismuth oxycarbonate in a concentration of between 0.1 and 10% by weight in the absence of any added stabilizer.

5. The method of imparting an ornamental pearlescent surface to a cellulose ester which comprises incorporating thereinto bismuth oxysalicylate in a concentration of between 1 and 20% by weight in the absence of any added stabilizer.

References Cited in the file of this patent

UNITED STATES PATENTS

| 1,607,622 | Higgins | Nov. 23, 1926 |
| 1,982,280 | Bell | Nov. 27, 1934 |
| 2,363,570 | Caprio | Nov. 28, 1944 |

FOREIGN PATENTS

| 972,903 | France | Sept. 6, 1950 |

OTHER REFERENCES

Ellis: "Chemistry of Synthetic Resins" (1935), vol. I, p. 13.

"Cellulose Acetate Plastics," Stannett (1950), p. 43.

Ott et al.: "High Polymers," vol. V, part III, page 1462.